Figure 1:
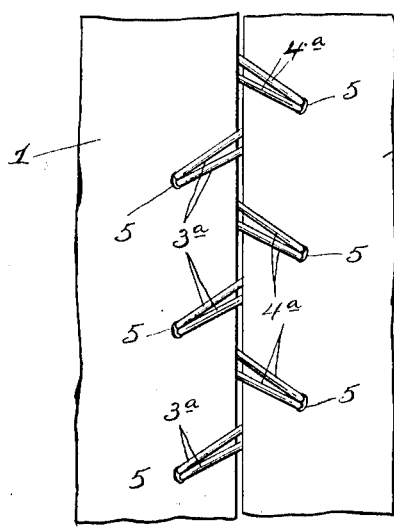

J. H. DORAN.
SEAM.
APPLICATION FILED DEC. 9, 1912.

1,072,102.

Patented Sept. 2, 1913.

3 SHEETS—SHEET 1.

WITNESSES.
Rose A. Leduc.
Gertrude M. Pitz.

INVENTOR
John H. Doran,
BY
Frank C. Curtis,
ATTORNEY

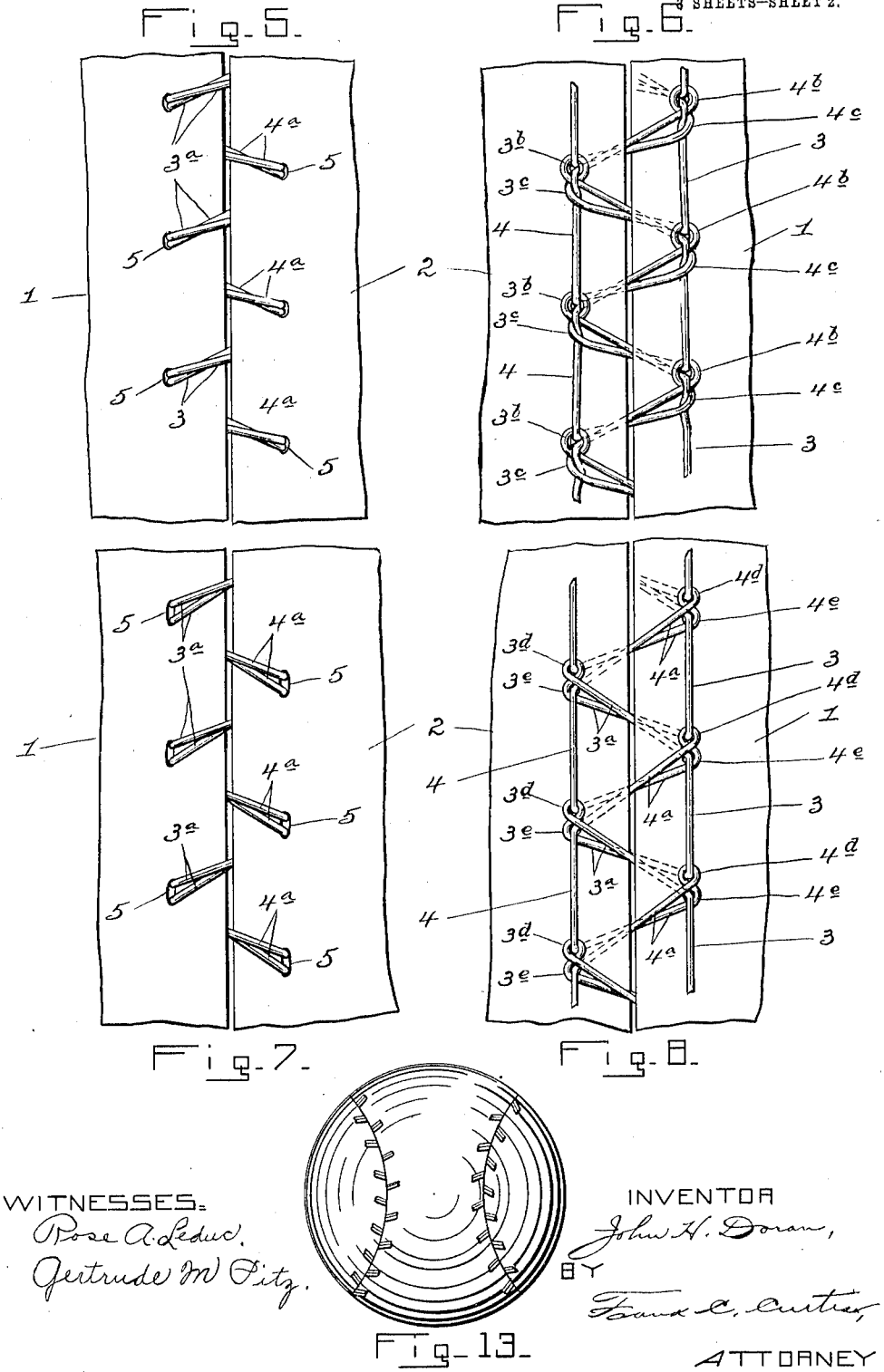

J. H. DORAN.
SEAM.
APPLICATION FILED DEC. 9, 1912.

1,072,102.

Patented Sept. 2, 1913.

3 SHEETS—SHEET 3.

WITNESSES:
Rose A. Leduc.
Gertrude M. Pitz

INVENTOR
John H. Doran
BY
Frank C. Curtis
ATTORNEY

UNITED STATES PATENT OFFICE.

JOHN H. DORAN, OF SCHENECTADY, NEW YORK.

SEAM.

1,072,102.

Specification of Letters Patent.   Patented Sept. 2, 1913.

Application filed December 9, 1912.   Serial No. 735,717.

*To all whom it may concern:*

Be it known that I, JOHN H. DORAN, a citizen of the United States, residing at Schenectady, county of Schenectady, and State of New York, have invented certain new and useful Improvements in Seams, of which the following is a specification.

The invention relates to such improvements and consists of the novel construction and combination of parts hereinafter described and subsequently claimed.

Reference may be had to the accompanying drawings, and the reference characters marked thereon, which form a part of this specification. Similar characters refer to similar parts in the several figures therein.

Figure 2:
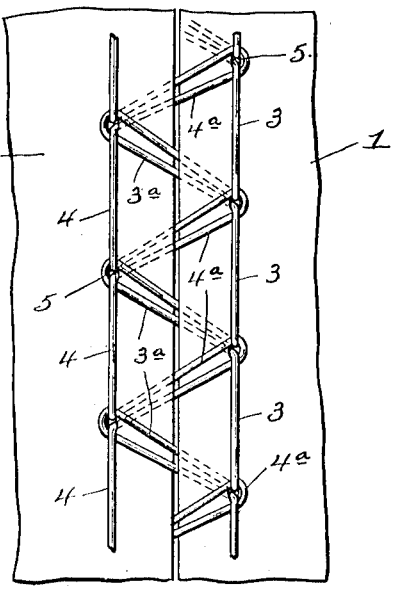
Figure 3:
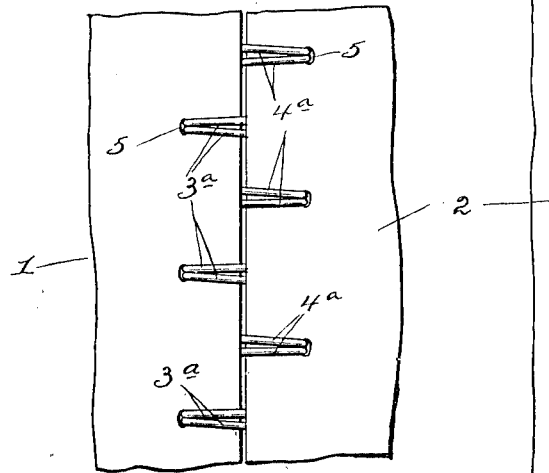
Figure 4:
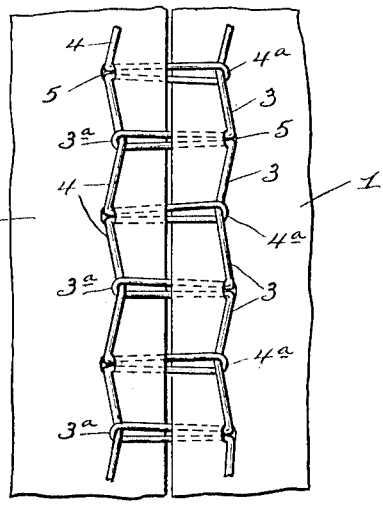
Figure 9:
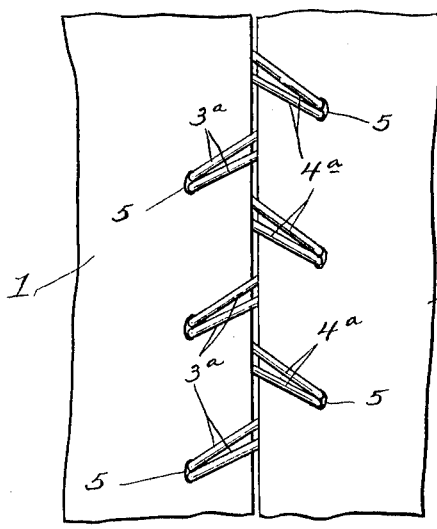
Figure 10:
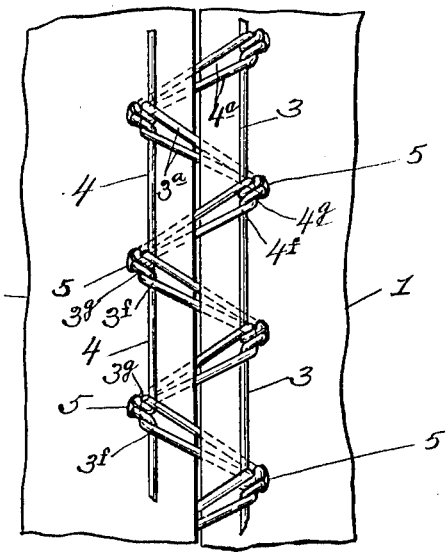
Figure 11:
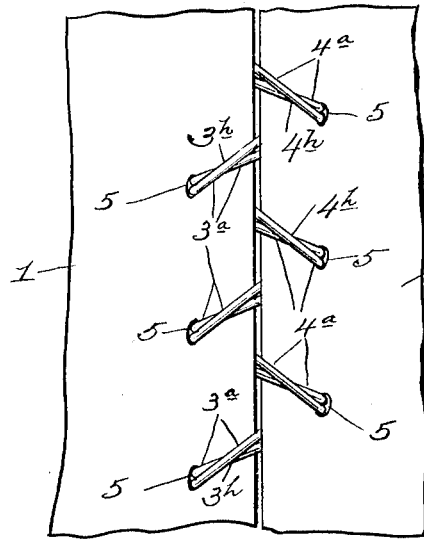
Figure 12:
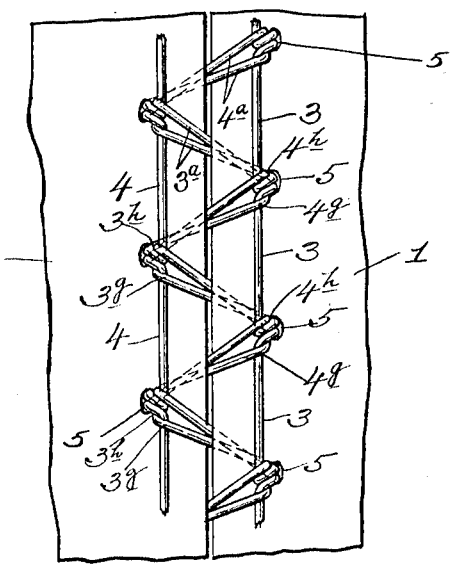

Figure 1 of the drawings is a top plan view showing the meeting edges of two pieces of material connected together by my improved seam. Fig. 2 is a bottom plan view of the same. Fig. 3 is a view similar to Fig. 1, showing a seam embodying my invention in different form. Fig. 4 is a bottom plan view of the same. Fig. 5 is a view similar to Fig. 1, showing a seam embodying my invention in another form. Fig. 6 is a bottom plan view of the same. Fig. 7 is a view similar to Fig. 1, showing a seam embodying my invention in another form. Fig. 8 is a bottom plan view of the same. Fig. 9 is a view similar to Fig. 1, showing a seam embodying my invention in another form. Fig. 10 is a bottom plan view of the same. Fig. 11 is a view similar to Fig. 1, showing a seam embodying my invention in another form. Fig. 12 is a bottom plan view of the same. Fig. 13 is a view of a baseball, the cover of which is stitched in accordance with my invention.

The drawings are shown on an enlarged scale, except Fig. 13.

My invention relates to improvements in seams for securing together two pieces of material abutting upon each other edge to edge.

It is adapted for so connecting together various kinds of materials as textile fabrics, leather &c.

It is particularly adapted for stitching leather baseball covers, and in the drawings I have shown the invention applied to a baseball cover.

In carrying out my invention, I employ two threads extending along the under side of the respective pieces of material which are arranged edge to edge, each of which threads has loops projecting through its respective piece of material from the under to the upper side thereof, each of which loops extends over the edge of its respective piece of material and under the edge of the other piece where it embraces the other thread.

The manner in which the loop of one thread embraces the other thread on the under side of the other piece of fabric differs in the different forms of my invention, shown in Figs. 2, 4, 6, 8, 10 and 12.

Referring to Figs. 1 and 2, I have shown pieces of material, 1 and 2, arranged edge to edge and secured together by threads, 3 and 4. The thread, 3, extends along the under side of the piece, 1, and the thread, 4, extends along the under side of the piece, 2, near the meeting edges of the two pieces. At regular intervals, loops, 3ª, of the thread, 3, are projected through the piece, 1, from the under to the upper side thereof, and at similar regular intervals, loops, 4ª, of the thread, 4, are projected through the piece, 2, from the under to the upper side thereof, the several loops projecting through needle-apertures, 5. The projecting end of each of the loops, 3ª, is extended over the edge of the piece, 1, and under the edge of the piece, 2, where it embraces or incloses the base of a loop, 4ª, of the other thread, 4, the branches of the loop, 3ª, extending above the stretches of thread, 4, leading from said loop, 4ª. In like manner the projecting end of each of the loops, 4ª, is extended over the edge of the piece, 2, and under the edge of the piece, 1, where it embraces or incloses the base of a loop, 3ª, of the other thread, 3, the branches of said loop, 4ª, passing above the respective stretches of thread, 3, leading from said loop, 3ª. The needle-apertures, 5, in the two pieces of fabric are in staggered relation to one another, the bases of the loops of one thread being thus located opposite the intervals between the bases of the loops of the other thread.

Referring to Figs. 3 and 4, the loops of the two threads extend through the respective pieces, 1 and 2, and each loop over the edge of its respective piece and under the edge of the other piece as above described, but instead of embracing the base of the loop of the other thread, each loop embraces a stretch of the other thread between neighboring loops thereof on the under side of the other piece of material, as shown particularly in Fig. 4.

Referring to Figs. 5 and 6, the loops of the two threads extend through the respective pieces, 1 and 2, and each loop over the edge of its respective piece and under the edge of the other piece, as above described, but instead of simply embracing the base of a loop of the other thread, as shown in Fig. 2, each loop not only embraces the base of a loop of the other thread, as shown at 3$^b$ and 4$^b$ in Fig. 6, but has one of its branches drawn between its other branch and the adjacent piece of material and embracing a stretch of the other thread between the embraced loop and the next loop thereof, as shown at 3$^c$ and 4$^c$ in Fig. 6.

Referring to Figs. 7 and 8, the loops of the two threads extend through the respective pieces, 1 and 2, and each loop over the edge of its respective piece and under the edge of the other piece, as above described, but each loop has one branch embracing only one branch of the base of a loop of the other thread, as shown at 3$^d$ and 4$^d$, in Fig. 8, and has its other branch drawn between its said branch and the adjacent piece of material, embracing the other branch of the base of said loop of the other thread, as shown at 3$^e$ and 4$^e$ in Fig. 8.

Referring to Figs. 9 and 10, the loops of the two threads extend through the respective pieces, 1 and 2, and each loop over the edge of its respective piece and under the edge of the other piece, as above described, but each loop has its branch extending across the under side of the respective stretches of the other thread leading from the base of a loop thereof, as shown at 3$^f$ and 4$^f$, and its end embracing the base of said loop thereof, on the side nearer the abutting edges of the pieces, 1 and 2, as shown at 3$^g$ and 4$^g$, in Fig. 10.

As shown in Figs. 11 and 12, the seam is the same as shown in Figs. 9 and 10, except that each loop is given a half twist, as shown at 3$^h$ and 4$^h$.

It will be understood that the views showing the under side of the seam are more or less diagrammatic, as the positions and widths of the loops will vary somewhat under different tensions.

What I claim as new and desire to secure by Letters Patent is—

1. The combination with two pieces of material abutting edge to edge; of two threads extending along the under side of the respective pieces near their abutting edges, each thread having loops extending through its respective piece of material from the under to the upper side thereof and extending over the edge of said piece and under the edge of the other piece and embracing said other thread on the under side of said other piece.

2. The combination with two pieces of material abutting edge to edge; of two threads extending along the under side of the respective pieces near their abutting edges, each thread having loops extending through its respective piece of material from the under to the upper side thereof and extending over the edge of said piece and under the edge of the other piece and embracing the base of a loop of the other thread on the under side of said other piece.

3. The combination with two pieces of material abutting edge to edge; of two threads extending along the under side of the respective pieces near their abutting edges, each thread having loops projecting through its respective piece of material from the under to the upper side thereof, each of said loops extending over the edge of said piece and under the edge of the other piece and embracing the base of a loop of the other thread, the bases of the loops of each thread being located opposite the respective intervals between the bases of the loops of the other thread.

4. The combination with two pieces of material abutting edge to edge; of two threads extending along the under side of the respective pieces near their abutting edges, each thread having loops extending through its respective piece of material from the under to the upper side thereof and extending over the edge of said piece and under the edge of the other piece, each of said loops having its branches extending across the under side of the respective stretches of the other thread leading from the base of a loop thereof and its end embracing the base of said loop in the other thread on the side nearer said abutting edges.

5. The combination with two pieces of material abutting edge to edge; of two threads extending along the under side of the respective pieces near their abutting edges, each thread having loops extending through its respective piece of material from the under to the upper side thereof and extending over the edge of said piece and under the edge of the other piece, each of said loops being formed with a half twist and having its branches extending across the under side of the respective stretches of the other thread leading from the base of a loop thereof, and its end embracing the base of said loop in the other thread on the side nearer said abutting edges.

6. A covered ball having its cover-members secured together edge to edge by two threads, each thread having loops extending through its respective cover-member from the inner to the outer side thereof and extending over the edge of said member and under the edge of the other member and embracing said thread on the under side of said other cover-member.

In testimony whereof, I have hereunto set my hand this 6th day of December, 1912.

JOHN H. DORAN.

Witnesses:
ANNA M. DORAN,
JESSE M. HOWELL.

Copies of this patent may be obtained for five cents each, by addressing the "Commissioner of Patents, Washington, D. C."